(12) United States Patent
Neufert

(10) Patent No.: US 6,357,227 B1
(45) Date of Patent: Mar. 19, 2002

(54) SYSTEM AND METHOD FOR REDUCING POLLUTANTS IN THE EXHAUST GAS OF AN INTERNAL COMBUSTION ENGINE

(75) Inventor: Ronald Neufert, Michelau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/670,651

(22) Filed: Sep. 27, 2000

Related U.S. Application Data

(63) Continuation of application No. PCT/DE99/00769, filed on Mar. 18, 1999, now abandoned.

(30) Foreign Application Priority Data

Mar. 27, 1998 (DE) ......................................... 198 13 723

(51) Int. Cl.$^7$ ................................................ F01N 3/02
(52) U.S. Cl. ............................ 60/309; 60/281; 60/286; 60/295; 60/303
(58) Field of Search ..................... 60/309, 310, 274, 60/320, 295, 303, 286

(56) References Cited

U.S. PATENT DOCUMENTS

| | | | | |
|---|---|---|---|---|
| 5,121,602 A | * | 6/1992 | McCorvey ................ | 60/310 |
| 5,189,878 A | * | 3/1993 | Robinson et al. .......... | 60/309 |
| 5,488,826 A | * | 2/1996 | Paas ........................ | 60/299 |
| 5,785,030 A | * | 7/1998 | Paas ........................ | 60/278 |
| 5,809,774 A | * | 9/1998 | Peter-Hoblyn et al. ..... | 60/274 |
| 5,857,324 A | * | 1/1999 | Scappatura et al. ........ | 60/274 |
| 6,026,641 A | * | 2/2000 | Liberty ..................... | 60/314 |
| 6,151,892 A | * | 11/2000 | Brewer et al. ............. | 60/313 |

FOREIGN PATENT DOCUMENTS

| | | |
|---|---|---|
| DE | 3002871 | 7/1981 |
| EP | 0577853 | 1/1994 |
| JP | 01143631 | 6/1989 |
| JP | 05015739 | 1/1993 |
| JP | 08057258 | 3/1996 |

OTHER PUBLICATIONS

Internationale Recherchenberichts (International Search Report) in PCT/DE/99/00769, Aug. 24, 1999.
Internationalen Vorläufigen Prüfungsberichts (International Preliminary Examination Report) in PCT/DE99/00769, Jun. 29, 2000.

* cited by examiner

Primary Examiner—Thomas Denion
Assistant Examiner—Binh Tran
(74) Attorney, Agent, or Firm—David M. Quinlan, P.C.

(57) ABSTRACT

An exhaust system for an internal combustion with a catalytic converter connected to the exhaust pipe for cleaning the engine exhaust gas in the presence of a reducing agent also includes a condensation water collector into which the exhaust gases are diverted prior to reaching the catalytic converter. The collector condenses moisture in the exhaust gas to produce liquid water condensate that is held in a reservoir. The water condensate is combined with a reactant capable of forming a reducing agent and the aqueous solution of the reactant is introduced into the exhaust gas upstream of the catalytic converter.

18 Claims, 2 Drawing Sheets

SYSTEM AND METHOD FOR REDUCING POLLUTANTS IN THE EXHAUST GAS OF AN INTERNAL COMBUSTION ENGINE

CROSS-REFERENCE TO RELATED APPLICATIONS

This application is a continuation of International Application PCT/DE99/00769, with an international filing date of Mar. 18, 1999, now abandoned.

BACKGROUND OF THE INVENTION

1. Field of the Invention

The present invention relates to treating exhaust gases of an internal combustion engine to reduce pollutants therein and, more particularly, to a system and method using water vapor condensed from the exhaust gases to producing a reducing agent introduced into the exhaust flow.

2. Description of Related Art

Devices for removing nitrogen oxides ("NOx") from the exhaust gas of an internal combustion engine, particularly a diesel engine, are known. This is referred to as denitrizing or "deNOxing" the exhaust gas.

A system disclosed in EP 0 577 853 B1 has an engine that includes an exhaust pipe, a deNOx catalytic converter connected to the exhaust pipe, a tank for a reducing agent which can be at least partially converted into ammonia, an ammonia generator connected upstream of the deNOx catalytic converter, and a device for introducing the reducing agent into the exhaust gas flowing to the deNOx catalytic converter. In the deNOx catalytic converter, selective catalytic reduction (SCR) takes place, with ammonia as an agent for reducing to nitrogen the nitrogen oxides in the exhaust gas.

In this device the ammonia may be generated from a nontoxic precursor substance, such as urea. In such a case, the ammonia used for the SCR reaction is formed by hydrolysis from an aqueous urea solution. The hydrolysis may take place by direct injection of an aqueous urea solution into the hot exhaust gas or by bringing the aqueous urea solution into contact with a hydrolysis catalyst. It is possible to use an aqueous urea solution of from 20 to 60% strength.

In another system, disclosed in DE 30 02 871 A1 (GB 2,068,259 A), a diesel engine exhaust pipe is connected to a device for cleaning the engine exhaust gas. A condensation water collector connected upstream of the device is in fluid communication with the exhaust pipe. However, the cleaning device in this system is a sorption filter.

SUMMARY OF THE INVENTION

An object of the invention is to provide an exhaust system of an internal combustion engine having a particularly compact device for cleaning the exhaust gas from the internal combustion engine.

A further object of the invention is to provide an effective, inexpensive method for reducing pollutants in the exhaust gas from the internal combustion engine, in which method the exhaust gas is fed via an exhaust pipe to a device for cleaning the exhaust gas.

In accordance with one aspect of the invention, an exhaust system for an internal combustion engine having an exhaust pipe for moisture-containing engine exhaust gas and a catalytic converter connected to the exhaust pipe for cleaning the exhaust gas in the presence of a reducing agent comprises a condensation water collector for accepting the exhaust gases and condensing moisture therein as liquid water condensate, a reservoir for holding the water condensate, and a storage chamber for incorporating the water condensate into an aqueous solution of a reactant for introduction into the exhaust pipe to provide the reducing agent.

In accordance with another aspect of the invention, a method for reducing pollutants in internal combustion engine exhaust gas containing moisture comprises the steps of directing at least a portion of the exhaust gas to a condensation water collector for condensing moisture in the exhaust gas as liquid water condensate, combining the water condensate with an aqueous solution of a reactant capable of forming a reducing agent, and introducing the aqueous solution into the exhaust gas prior to the entry of the exhaust gas into a catalytic converter for cleaning the exhaust gases in the presence of a reducing agent.

BRIEF DESCRIPTION OF THE DRAWINGS

Exemplary embodiments of the invention are explained in more detail with reference to the accompanying drawings, in which.

It will be appreciated that these figures are in part diagrammatic and not to scale, in particular in terms of their spatial arrangement. In addition, like components are given the same reference numerals and letters in the different figures.

DETAILED DESCRIPTION OF THE PREFERRED EMBODIMENTS

Figure 1:
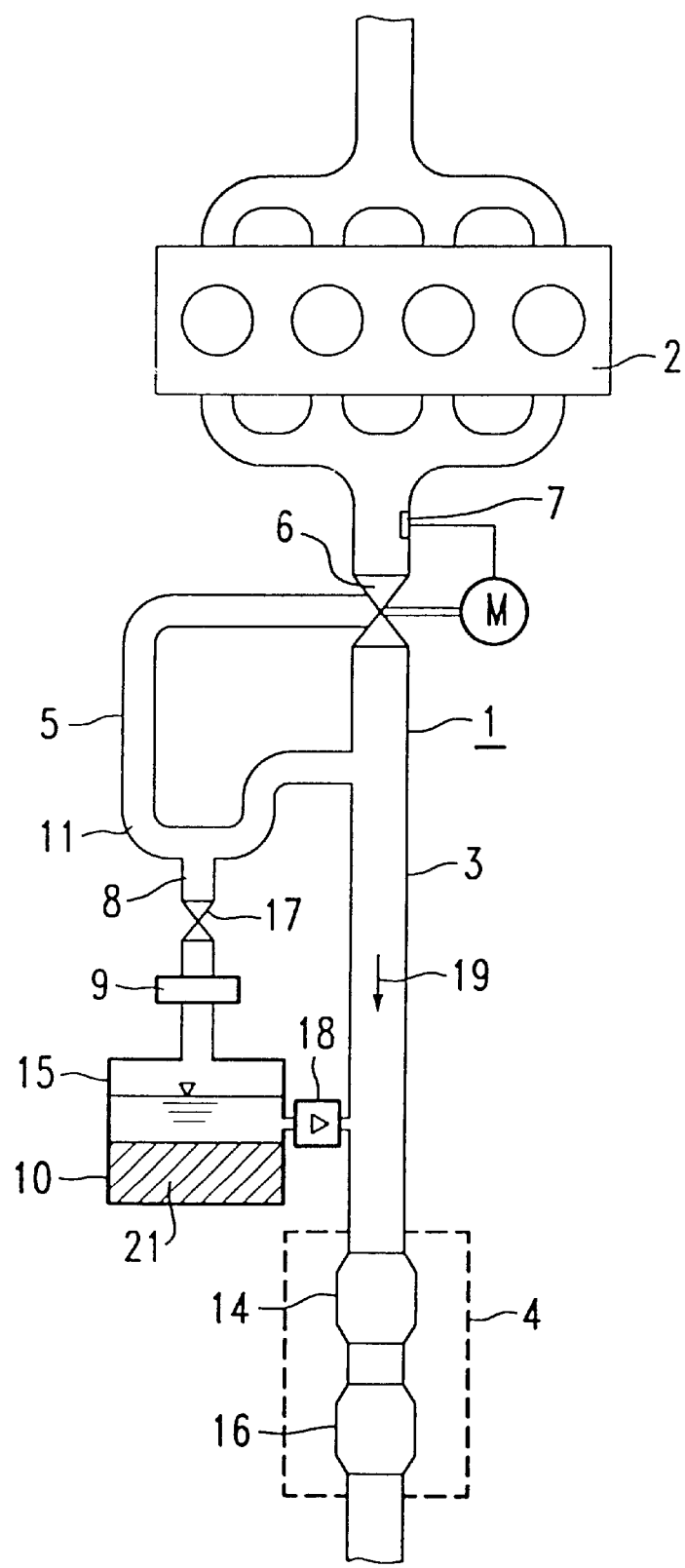
FIG. 1 diagrammatically depicts a first embodiment of an exhaust system according to the invention, having a condensation water collector comprising a U-shaped pipe.

FIG. 1 diagrammatically depicts an exhaust system 1 of an internal combustion engine 2. The exhaust system 1 has an exhaust pipe 3 that accepts exhaust gases from the internal combustion engine 2. The exhaust pipe 3 carries exhaust gas flowing generally in the direction of the arrow 19 away from the engine 2. The exhaust pipe 3 leads to a device 4 that cleans the exhaust gas by removing pollutants therein. A valve, here shown as a two-way valve 6, which can be actuated by means of a motor M, is arranged in the exhaust pipe 3. A sensor 7, which detects whether there is sufficient water in the exhaust gas 19 to warrant operation of the system, is disposed upstream of the valve 6 relative to the direction 19 of exhaust gas flow. The sensor 7 is connected to the motor M through suitable electrical circuit components (not shown) for actuating the valve 6.

A condensation water collector 5 is in fluid communication with the exhaust pipe 3 through the valve 6, which diverts exhaust gas from the exhaust pipe 3 into the collector 5. The collector 5 includes a U-shaped pipe section 11 with an outlet 8 that is at the lowest position of the collector 5. In other words, when the system is in its normal operating orientation, condensate in the collector 5 will collect at the U-shaped section 11 and the outlet 8 by the force of gravity. A discharge valve 17 is arranged in this outlet 8, allowing the water condensate to be discharged freely or in metered fashion from the collector 5. As illustrated in FIG. 1, the collector 5 then reintroduces the exhaust gas diverted by the valve 6 into the collector 5 back into the exhaust pipe 3.

The condensate flows from the valve 17 into a cleaning device 9, which in this embodiment comprises a filter, for cleaning the water condensate. After flowing through the filter 9, the condensate enters a storage chamber 10 for a reactant 21, preferably a solid such as urea capable of forming a reducing agent, for example, ammonia, when in an aqueous solution. For convenience, the reactant in the storage chamber is sometimes referred to herein as a "reducing agent," but those skilled in the art will understand the meaning of such reference.

In the present embodiment, the chamber 10 provides a reservoir 15 into which the water condensate flows so that a solution of the reducing agent 21 in the water condensate is formed in the reservoir 15. The reservoir 15 is connected in fluid communication with the exhaust pipe 3 through a metering device 18. Therefore, the solution of the reducing agent 21 in the water condensate can be introduced via the metering device 18 into the exhaust pipe 3 and thus into the exhaust gas 19. In an alternate construction, the reservoir 15 may be separate from the storage chamber 10.

A device 4 for reducing pollutants in the exhaust gas comprises a catalytic converter 14, in particular a deNOx catalytic converter, and optionally an additional oxidation catalytic converter 16. The device 4 is disposed in the exhaust pipe 3 downstream of the metering device 18 relative to the flow direction 19 of the exhaust gas. The catalytic converter 14 may have a support body made from metal, for example a metal foil or metal mesh, and an inert or refractory ceramic material, which support is coated with a suitable catalytically active material. Those skilled in the art will recognize that the catalytic converter 14 may be constructed in any suitable alternative manner, such as entirely from a catalytically active material configured as, for example, an unsupported extruded honeycomb body.

Figure 2:
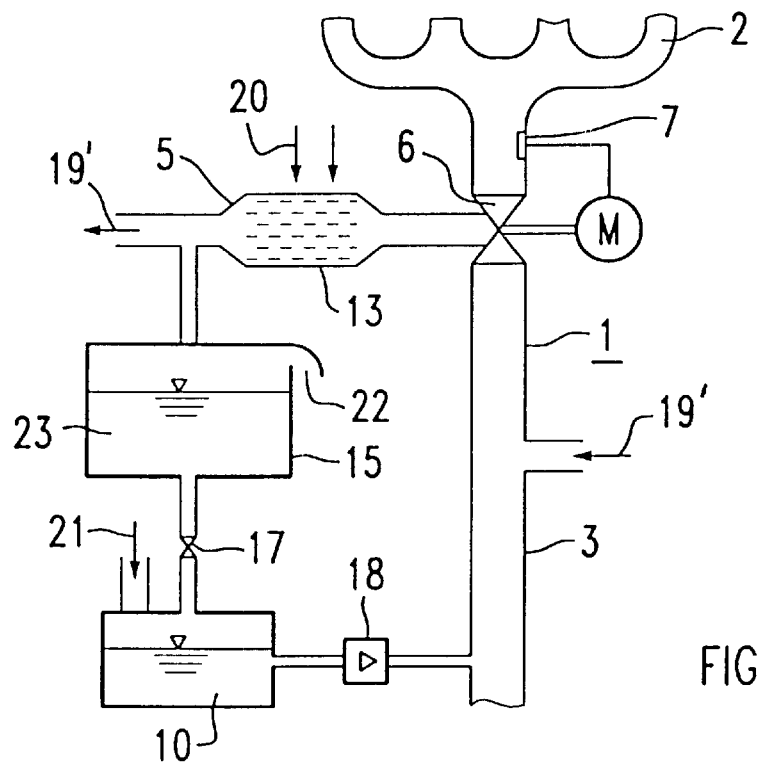
FIG. 2 diagrammatically depicts a second embodiment of an exhaust system according to the invention, having a condensation water collector comprising a condenser.

FIG. 2 shows an alternative embodiment of the condensation water collector 5. A condenser 13 can be cooled by cooling air 20, in particular an air stream. Downstream of the condenser 13, the condensation water collector 5 is connected to a reservoir 15 for the water condensate 23, which in turn is connected to a separate storage chamber 10 for a solution of a suitable reactant. The reservoir may have an overflow opening 22 that enables excess water condensate to be released to the environment.

A solution of reducing agent reactant and water condensate is held in the storage chamber 10 and can be introduced via the metering device 18 to the exhaust pipe 3. The reducing agent may be supplied in solid form as urea 21, shown being introduced to the storage chamber through a feed opening provided for that purpose. From the condenser 13, the exhaust gas from which water condensate 23 has been removed is reintroduced back into the exhaust pipe 3 downstream of the valve 6, as shown in by the arrows 19'.

Figure 3:
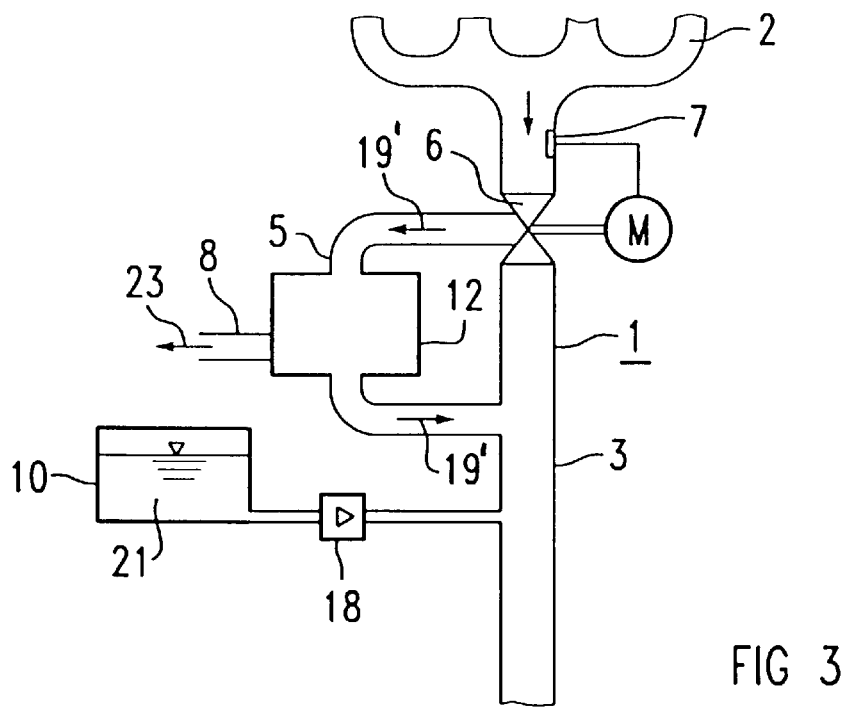
FIG. 3 diagrammatically depicts a third embodiment of an exhaust system according to the invention, having a condensation water collector comprising a cold trap.

FIG. 3 illustrates another alternate embodiment of the exhaust system 1 in which the condensation water collector 5 includes a cold trap 12. The cold trap 12 has an outlet 8 for the condensed water 23, which, as before, is used to produce an aqueous solution of a reducing agent 21. From the cold trap 12 the exhaust gas, from which water condensate 23 has been removed, is reintroduced back into the exhaust pipe 3 downstream of the valve 6, as shown in by the arrows 19'. The reducing agent solution is made up using the water condensate 23 and is introduced into the exhaust pipe 3 from the storage chamber 10, which is separate from the condensation water collector 5, through the metering device 18 upstream of the device 4 (not shown in FIG. 3), as described above.

It will be understood that the individual components of these three exemplary embodiments can be combined with one another depending on the demands imposed and also that individual components can be omitted. A common feature of all three exemplary embodiments is that, in particular during a cold start of the internal combustion engine 2, say a diesel engine of a passenger automobile, the water-containing exhaust gas is fed to the condensation water collector 5.

The condensation water collector 5 removes a large proportion of the moisture present as water vapor in the exhaust gas, and the drier exhaust gas is fed to a device for cleaning the exhaust gas, in particular for deNOxing the exhaust gas. The condensed water is incorporated into an aqueous solution of a reducing agent reactant, which in turn is introduced to the exhaust pipe 3 upstream of the device 4 for cleaning the exhaust gas. Not only does this counteract the risk of deactivation of the exhaust-cleaning device 4, but also the use of a water reservoir 15 for the condensed water 23 and a storage chamber 10 for a reducing agent that is present in the solid phase results in a particularly compact design of the entire exhaust system 1.

The invention is based on the recognition that during a cold start of the internal combustion engine, say in winter, condensation of water vapor from the exhaust gas burdens the exhaust system. At least some of the water vapor will typically condense before the exhaust gas enters a pollutant-cleaning device, and the condensed water accordingly passes through the device. If the device is, say, a catalytic converter, the condensed water impedes the catalytic reaction. Moreover, the presence of condensed water may allow catalyst poisons to penetrate deep into the system of pores of the catalytic converter and partially deactivate it. However, the present invention permits utilization of the condensed water to good effect by using it as a solvent for a reducing agent, such as for example ammonia. In this way, the stock of solvent that must be carried is reduced, since the reducing agent solution may be made up using the water condensate.

The flow connection for the water to the reducing agent reactant may be provided, for example, via an outlet for the water condensate, with or without a corresponding cleaning device. In a separate water reservoir it is possible to keep a sufficient quantity of water condensate that can additionally be used for other applications in a vehicle with an internal combustion engine. By way of example, the condensed water could be used for a washer unit for a windshield, a headlamp, a taillight or other parts of the motor vehicle.

The reducing agent reactant may, for example, be held in the solid state and made into an aqueous solution by the condensation water. This aqueous solution can be fed to the device for cleaning the exhaust gas for the purpose of reducing, for example, nitrogen oxides. This also allows the exhaust system to be of particularly compact design, since both the storage for the reducing agent and the water reservoir require little space. As compared to holding a stock of reducing agent that is already in the form of an aqueous solution, it is therefore possible to achieve a considerable space saving.

In a catalytic converter, for example, an oxidation or reduction catalytic converter, a water condensate collector prevents active components of the catalytic converter from being washed out. It can assist in preventing deactivation of the catalytic converter by heavy metals, phosphorus and silicon compounds, for example, from added lubricating oil, which are contained in the exhaust gas, because a large proportion of the water condensate formed during a cold start is removed upstream of the actual catalytic converter system. This is of particular interest especially for passenger automobiles, since the number of cold starts in short-haul traffic may proportionally be very high and the deactivation effects on the catalytic converter which are to be expected may be correspondingly serious. Therefore, the exhaust system is particularly suitable for use in diesel engines for passenger automobiles.

Preferably, the exhaust gas can be fed out of the exhaust pipe via a valve to the condensation water collector. The valve produces a flow connection between the exhaust pipe and the condensation water collector. The valve may in this case be designed as a two-way valve which in one position provides a direct path to the device for cleaning the exhaust gas and in a second position closes off the direct path and provides a path to the condensation water collector. It is also possible to use a simple valve which, for example, only closes the direct path or is arranged in the path upstream of the condensation water collector, without affecting the direct path.

The valve is preferably switchable or controllable. The valve is preferably actuated, that is, opened or closed, as a function of the moisture content in the exhaust gas, in particular during and shortly after a cold start of the internal combustion engine. The valve actuation may in such a case be effected via a sensor which is suitable for detecting whether relevant amounts of water vapor are present in the exhaust gas. The sensor may be a humidity sensor which directly measures the water content of the exhaust gas. It may also be a temperature sensor which records the temperature of the exhaust gas and therefore makes it possible to calculate the amount of water contained in the exhaust gas. If the relative moisture content in the exhaust gas has fallen to a defined level, for example, because the temperature is correspondingly high, it is possible to actuate the valve in such a manner that the flow connection between the condensation water collector and the exhaust pipe is interrupted.

The condensation water reservoir may have an overflow outlet for excess condensed water, which via an overflow outlet of this type can be released directly to the environment. It is also possible for a cleaning device, in particular with a filter, to be provided between the reservoir and a reducing agent storage chamber, by means of which the condensed water is prepared for further processing.

The condensation water collector preferably has a U-shaped pipe, a cold trap, a condenser or a similar device suitable for condensing and collecting water vapor or water which has already condensed. A condenser may in this case be designed as a tube condenser which is cooled, for example, by the air stream produced by movement of the motor vehicle under the power of the internal combustion engine.

The method aspects of the invention will be immediately apparent from the above description. That is, reducing pollutants in the exhaust gas from an internal combustion engine, in particular from a diesel engine, for example in a passenger automobile, is achieved by a method in which water contained in the exhaust gas is condensed and at least partially removed before the exhaust gas is passed to a device for cleaning the exhaust gas. According to the invention, the condensed water is collected in a condensation water collector and, from there, combined with a reducing agent, in particular a reducing agent which is present in solid form (for example, urea), to form an aqueous solution. This solution is then fed to a catalytic converter, in particular a deNOx catalytic converter. The advantages of a method of this type correspond to the advantages which have already been outlined for the exhaust system described above.

Although preferred embodiments of the invention have been depicted and described, it will be understood that various modifications and changes can be made other than those specifically mentioned above without departing from the spirit and scope of the invention, which is defined solely by the claims that follow.

what is claimed is:

1. An exhaust system for an internal combustion engine having an exhaust pipe for moisture-containing engine exhaust gas and a catalytic converter connected to the exhaust pipe for cleaning the exhaust gas in the presence of a reducing agent, the exhaust system comprising:

a condensation water collector for accepting the exhaust gases and condensing moisture therein as liquid water condensate;

a reservoir for holding said water condensate; and a storage chamber for combining said water condensate with a reactant to form the reducing agent, said storage chamber having a connection to the exhaust pipe for introducing the reducing agent into the exhaust gas upstream of the catalytic converter.

2. The exhaust system of claim 1, further comprising a valve for placing said condensation water collector in fluid communication with the exhaust pipe.

3. The exhaust system of claim 2, wherein said valve is controllable to vary the quantity of exhaust gas introduced into said condensation water collector.

4. The exhaust system of claim 3, further comprising a sensor for detecting the presence of water in the exhaust gas in the exhaust pipe, wherein said valve controls the quantity of exhaust gases introduced into said condensation water collector in response to said sensor.

5. The exhaust system of claim 4, wherein said sensor is at least one of a humidity sensor and a temperature sensor.

6. The exhaust system of claim 1, further comprising a cleaning device for cleaning said water condensate from said condensation water collector.

7. The exhaust system of claim 6, wherein said cleaning device comprises a filter.

8. The exhaust system of claim 1, wherein said storage chamber forms said reservoir.

9. The exhaust system of claim 1, wherein said reservoir is separate from said storage chamber and is in fluid communication therewith.

10. The exhaust system of claim 1, wherein said condensation collection chamber includes a U-shaped pipe section with an outlet disposed at the lowest position of said U-shaped pipe section when the exhaust system is in its normal operating orientation.

11. The exhaust system of claim 1, wherein said condensation collection chamber comprises a cold trap.

12. The exhaust system of claim 1, wherein said condensation collection chamber comprises a condenser.

13. The exhaust system of claim 1, wherein said internal combustion engine is a diesel engine of a motor vehicle.

14. The exhaust system of claim 13, wherein said condensation collection chamber comprises a condenser arranged for cooling by an air stream produced by movement of the motor vehicle under power of the internal combustion engine.

15. A method for reducing pollutants in internal combustion engine exhaust gas containing moisture, the method comprising the steps of:

directing at least a portion of the exhaust gas to a condensation water collector for condensing moisture in the exhaust gas as liquid water condensate;

forming a reducing agent by combining the water condensate with a reactant that forms a reducing agent when combined with water; and introducing the reducing agent into the exhaust gas prior to the entry of the exhaust gas into a catalytic converter for cleaning the exhaust gases in the presence of a reducing agent.

16. The method of claim 15, further comprising the step of controlling the quantity of exhaust gases directed to the condensation water collector.

17. The method of claim 16, further comprising the step of detecting the amount of moisture in the exhaust gases and controlling the quantity of exhaust gases directed to the condensation water collector in accordance with the amount of moisture.

18. The method of claim 15, further comprising the step of cleaning said water condensate before combining it with the reducing agent.

* * * * *